(12) United States Patent
Cheng

(10) Patent No.: US 7,337,518 B2
(45) Date of Patent: Mar. 4, 2008

(54) METHOD OF FABRICATING TITANIUM LINED COMPOSITE COOKWARE

(75) Inventor: Stanley Kin Sui Cheng, Vallejo, CA (US)

(73) Assignee: Meyer Intellectual Properties Limited (BV)

(*) Notice: Subject to any disclaimer, the term of this patent is extended or adjusted under 35 U.S.C. 154(b) by 454 days.

(21) Appl. No.: 11/083,584

(22) Filed: Mar. 18, 2005

(65) Prior Publication Data

US 2005/0205646 A1 Sep. 22, 2005

Related U.S. Application Data

(60) Provisional application No. 60/554,735, filed on Mar. 19, 2004.

(51) Int. Cl.
*B23P 11/00* (2006.01)
*A47J 27/00* (2006.01)
*B32B 15/20* (2006.01)

(52) U.S. Cl. .............. 29/505; 72/379.4; 428/548; 428/615; 220/573.1; 220/573.3; 220/62.13; 220/62.17; 220/912

(58) Field of Classification Search .............. 29/505, 29/509, 525.14; 72/347, 348, 349, 363, 379.4; 428/548, 579, 615, 654, 64.1; 220/573.1, 220/573.3, 62.13, 62.17, 626, 650, 654, 912
See application file for complete search history.

(56) References Cited

U.S. PATENT DOCUMENTS

| | | | | |
|---|---|---|---|---|
| 1,649,841 A | * | 11/1927 | May | 72/347 |
| 2,471,663 A | * | 5/1949 | Tietz | 228/155 |
| 4,541,411 A | * | 9/1985 | Woolf | 126/390.1 |
| 4,818,350 A | * | 4/1989 | Batzar | 205/188 |
| 5,532,460 A | | 7/1996 | Okato et al. | |
| 5,694,674 A | * | 12/1997 | Flammang | 29/460 |
| 5,809,630 A | * | 9/1998 | Coissard | 29/505 |
| 6,109,504 A | | 8/2000 | Groll | |

* cited by examiner

*Primary Examiner*—Jermie E. Cozart
(74) *Attorney, Agent, or Firm*—Edward S. Sherman

(57) ABSTRACT

A Cooking vessel has an interior lining of titanium or an allow thereof. The bottom is optionally formed of anodized aluminum as the titanium walls withstand the corrosive environment of the anodizing bath. The titanium lining is more resistant to corrosion, staining and attack by acid foods than anodized aluminum. The method of forming the cooking vessel allows a relatively thin layer of titanium metal to be used as the lining, thus reducing the total weight as well as the cost of the cooking vessel.

12 Claims, 3 Drawing Sheets

METHOD OF FABRICATING TITANIUM LINED COMPOSITE COOKWARE

RELATED APPLICATIONS

This application claims priority from U.S. Provisional Patent Application Ser. No. 60/554,735, filed Mar. 19, 2004, the disclosure of which is incorporated herein by reference in its entirety.

BACKGROUND OF INVENTION

The present invention relates to improved cookware, particularly to cooking vessels, such as pots and pan with superior durability and extended lifetimes of use.

Prior methods of constructing cookware involve forming a pot or pan from a single sheet of stainless steel, aluminum or copper, which may include a laminate construction. Preferably, the pans bottom is constructed totally of either aluminum or copper, or a laminated construction thereof to provide improved heat transfer to rapidly heat the pan, for quick responsiveness to the applied heat, and evenly heat the foodstuff contained therein.

Recently anodized aluminum pans have found favor in the marketplace, due to the initial appearance in a dark gray or charcoal color, and superior hardness of the surface that avoids marring or scratching from cleaning or scraping with cooking utensils. Anodized aluminum pans also offer superior durability with respect to resisting mars and scratch on the outside, due to contact with burner elements, flames or metal structures used to support the cooking vessel above a burner's flames. The superior hardness results from the anodizing process which forms a hard and well adhered out layer of aluminum oxide, a ceramic material that is several time harder than stainless steel as well as the much softer aluminum.

Although anodized aluminum cookware offers many advantages, it can also have disadvantages for some consumers. For example, the pots are considerably heavier despite the lower density of aluminum as compared to stainless steel, as the walls need to be sufficiently thick to insure structural integrity, whereas a laminate of stainless steel cladding an aluminum or aluminum/copper composite bottom pan is significantly lighter. Although anodized pans are initially of a pleasing appearance, they do stain and tarnish readily when high acidity foods are cooked therein. While stainless steel offers excellent chemical resistance it can only be readily be combined with a non-anodized aluminum exterior, as the anodizing process itself is entirely corrosive to stainless steel.

It is thus an object of the present invention to provide cooking pans with superior exterior durability and hardness that are resistant to stains from acidic foods.

It is also an object to provide pans of high durability that have an interior surface that is more stain resistant than conventional anodized aluminum cookware, but have an anodized exterior aluminum surface providing both a durable and pleasing outer surface appearance, being substantially free from mars and scratch that affect softer metal finishes.

SUMMARY OF INVENTION

In the present invention, the aforementioned and other objects are achieved by fabricating a cooking pot or pan with substantially upright walls and a bottom of aluminum metal having titanium metal, or an alloy thereof, as a lining for at least a portion of the interior surface of the vessel. In the more preferred embodiments, the cooking vessel is ultimately treated in anodizing bath under conditions that convert the outer surfaces of the aluminum metal to an adherent and durable aluminum oxide layer. The titanium lining is sufficiently resistant to such electrochemical treatment that the surface is readily restored to a bright metallic finish. The finished titanium lining resists staining by acid foods, unlike anodized aluminum surface finishes.

The above and other objects, effects, features, and advantages of the present invention will become more apparent from the following description of the embodiments thereof taken in conjunction with the accompanying drawings.

BRIEF DESCRIPTION OF DRAWINGS

FIG. 2A-E illustrate a method of fabricating the cooking vessel of FIG. 1 via a sequence of cross-sectional elevations.

DETAILED DESCRIPTION

Figure 1:
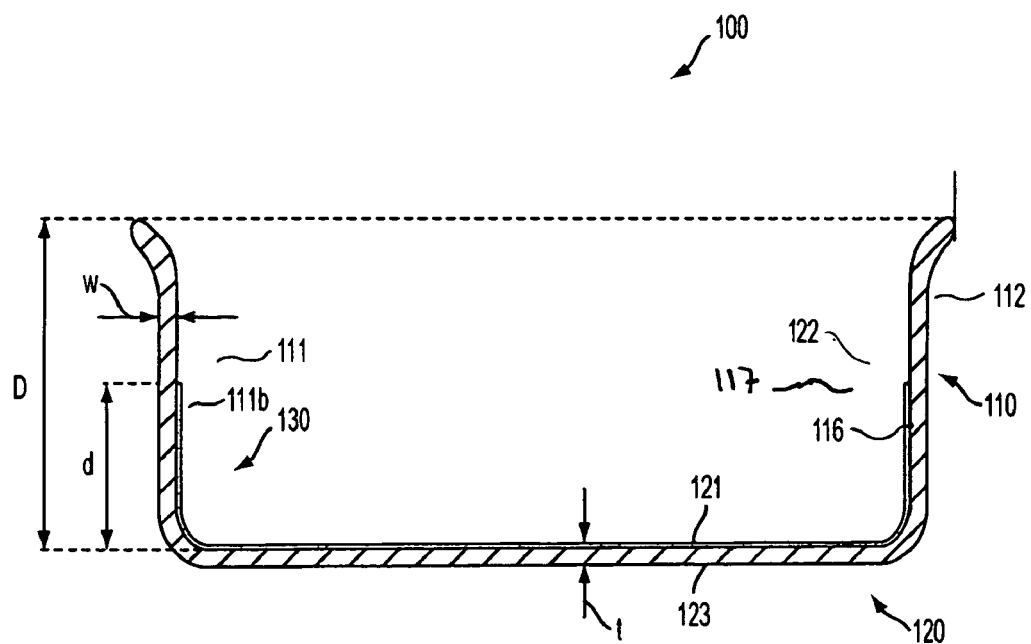
FIG. 1 is a cross-sectional elevation of an embodiment of the invention.
Figure 2A:
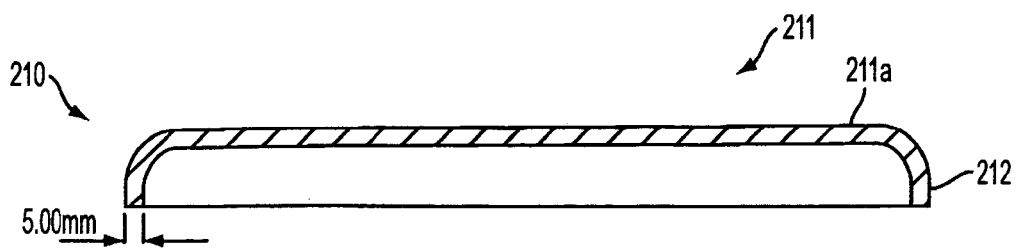
Figure 2B:
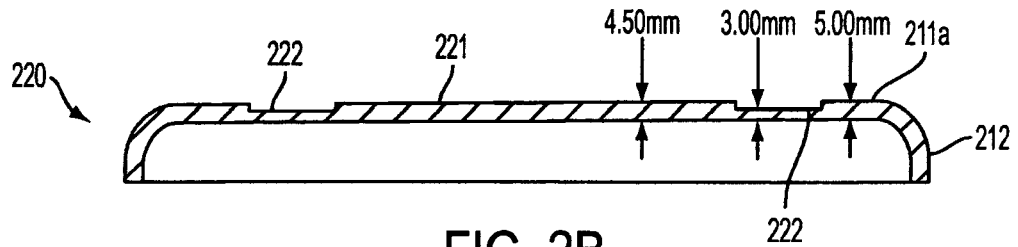
Figure 2B:
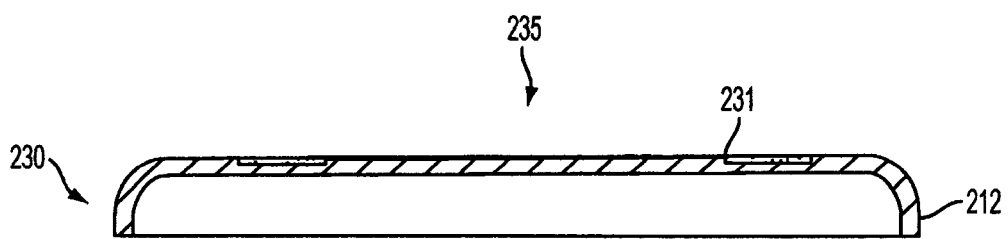
Figure 2D:
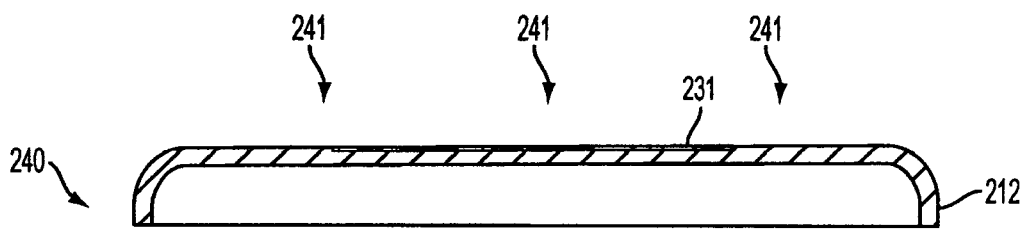
Figure 2E:
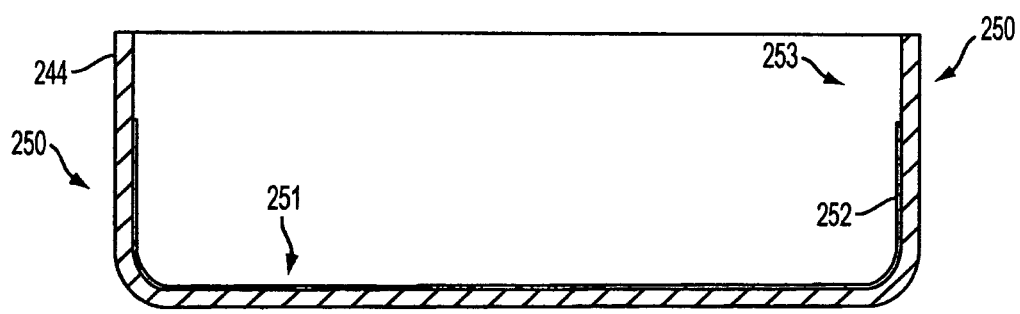

In accordance with the present invention, FIG. 1 illustrates the construction of a composite cookware vessel 100 having substantially vertical or upstanding wall 110 disposed about and connected to a heat-conducting base or bottom portion 120, thus forming a fluid retaining container with an open top. The one or more handles that are conventionally disposed on the outer surface of cookware are omitted merely for clarity. The outer portion 112 of the walls 110 is constructed of aluminum, or an alloy thereof, whereas a lower portion 111b of the interior wall 111 is titanium or an alloy thereof. The construction of the wall with a lower portion 111b presenting a titanium surface is achieved by fabricating the pan with a titanium liner 130 which cover the bottom of upper aluminum layer 122, and forms the inside surface of the bottom of the pan 121. The titanium liner 130 extends upward to protect a lower portion 116 of the aluminum wall 117. The thickness of the upper and lower sections of the wall, labeled as t in the figure, is about 4 mm. The titanium liner thus protect the inner surface 111 of aluminum wall 117 for a total depth, labeled d in the figure, of several inches, that is generally equal to about one half the total depth of the pan, labeled D in the figure, of the pan or cooking vessel 100.

Titanium metal and related allows are very resistant to highly acidic foods, which attack anodized aluminum finishes by staining or tarnishing to a whitish color, as the oxide is removed. Thus, titanium would be a preferred alternative material to stainless steel for constructing the interior of cooking vessels. As titanium is more costly material than aluminum, it is preferable to reduce the thickness of the titanium liner 130 to less than about 1 mm, but more preferably to a thickness of about 0.5 more less. Reducing the thickness of the titanium liner 130 to a thickness in the range of 1.0 to 0.5 mm, or less, provides sufficient corrosion protection with only an incremental increase in material cost. The construction of FIG. 1 is particularly preferred when it is desirable to provide an anodized aluminum surface on at least the exterior, which is harder than most bare metal surfaces. The anodizing process is a well known electrochemical oxidation process that converts the exposed aluminum surface to a thick and readily adherent layer of aluminum oxide. Anodized aluminum has the grey or black finish of on the outside, which has a pleasing and uniform external appearance. The anodized aluminum is complemented in this embodiment by the more chemically resistant titanium metal lining on at least a portion of the interior surface, providing superior stain resistance with respect to acid foods. Forming the interior wall of titanium, as opposed to other metals such as stainless steel, particularly enables such a construction as the titanium resists that strongly acidic bath used to anodize aluminum metal. During the anodizing, the tarnished or oxidized titanium is burnished.

It should be appreciated that the minimum thickness of the titanium liner will depend on the nature and thickness of the materials used to form the exterior wall and bottom of the cookware, as well as the method for bonding, attaching or providing a coating of titanium as the interior surface of the article of cookware. It should be further appreciated that in alternative embodiments the bottom of the pan 120 can be constructed of multiple layers of diverse materials, as a relatively thin outer aluminum layer is sufficient for providing a durable mar resistant hard-anodized coating.

Cooking vessels are commonly formed by impact bonding a deep drawn shape that forms the fluid containing vessel, to a thicker bottom section, which provides the desired thermal characteristics. A plurality of drawn multiple vessel can be impact bonded to essentially encapsulate a thicker metal disc between them, permitting the selection of different materials for the inner and outer surface of the pan, as well as for protecting the thermally conductive materials from tarnishing or scratching. When the disk is bonded to the inside of a metallic vessel the upper surface of the disk forms the interior bottom of the pan, whereas when the disk is bonded to the bottom of the metallic vessel, the interior surface finish of the pan is the same as the material used to form the vessel. These alternative bonding methods enable the formation of other embodiments that deploy different materials on the inside and outside of the pan for functional as well as alternative design variations to suit the consumers desire to be able to select from numerous styles of cookware.

Although aluminum is favored as a heat conductor, the bottom section 120 may also include one or more copper layers to spread or distribute the heat evenly across the width of the bottom. Such a heat conducting copper layer, while commonly extending only across the bottom of the pan 120, can optionally extend into at least a portion of sidewalls 110, where it will be sandwich or laminated between the titanium shell 130 and the lower section 116 of the aluminum wall 117. Alternatively, a copper layer can also extend into substantially the entirety of upright aluminum wall 117, by constructing the wall 117 of multiple layers. Thus depending on the strength of the material used in such a laminate (as this material can differ from the material used in the bottom of the pan) it is possible to reduce the total thickness of the aluminum wall, w, and hence reduce the weight of the pan.

FIG. 2 illustrates the sequences of processes and components used in another embodiment of the invention to form the cooking vessel of FIG. 1. In FIG. 2A, a first aluminum preform 210 is formed by the drawing deformation of an aluminum disk. Prefrom 210 is axially symmetric about the centerline in the diagram and has been drawn to form short downward facing sides 212 that extend perpendicularly from the substantially planar bottom 211 to surround the periphery thereof The preform 210 at this stage has a substantially uniform thickness of about 5 mm. FIG. 2B illustrates the completion of the next step in the process in which a series of circular rings or grooves are formed in surface 211a of bottom 211. About 0.5 to 1 mm of material is removed from a central disk region 221. The central disk region 221 is surrounded by a deeper ring shaped groove 222 extending about 2 mm inward from the profile of bottom 211, for example, with the preform shape illustrated in the figure. As shown in FIG. 2C, a thin titanium disk 231 with a thickness of about 0.6 mm is inserted into the recess formed by regions 221 and 222. The recess is deliberately formed to improve the bonding of the titanium and aluminum by making the depth of the groove deeper than the thickness of disk 231. The titanium disk 231 is next spot welded to bottom surface 211a at the center indicated by arrow 235. Next, as shown in FIG. 2D, the titanium disk is impact bonded or welded to the bottom surface. The impact boding process cause the more malleable metal to flow and fill the recess. Finally, the last step, FIG. 2E, is the deep drawing of the preform 210, that now includes the co-bonded titanium and aluminum disks, from the direction of arrows 241. Deforming the perform 210 in the direction 241 against a male mode disposed on the opposite side of the preform inverts and extends the wall portions 244 such that the titanium disk is also drawn to covers the inner bottom surface 251 and a lower portion 252 of interior walls 253, forming cooking vessel 250. This final drawing process reduces the aluminum wall thickness to about 4 mm, while the titanium thickness is reduced only slightly to about 0.5 mm in thickness.

Figure 3:
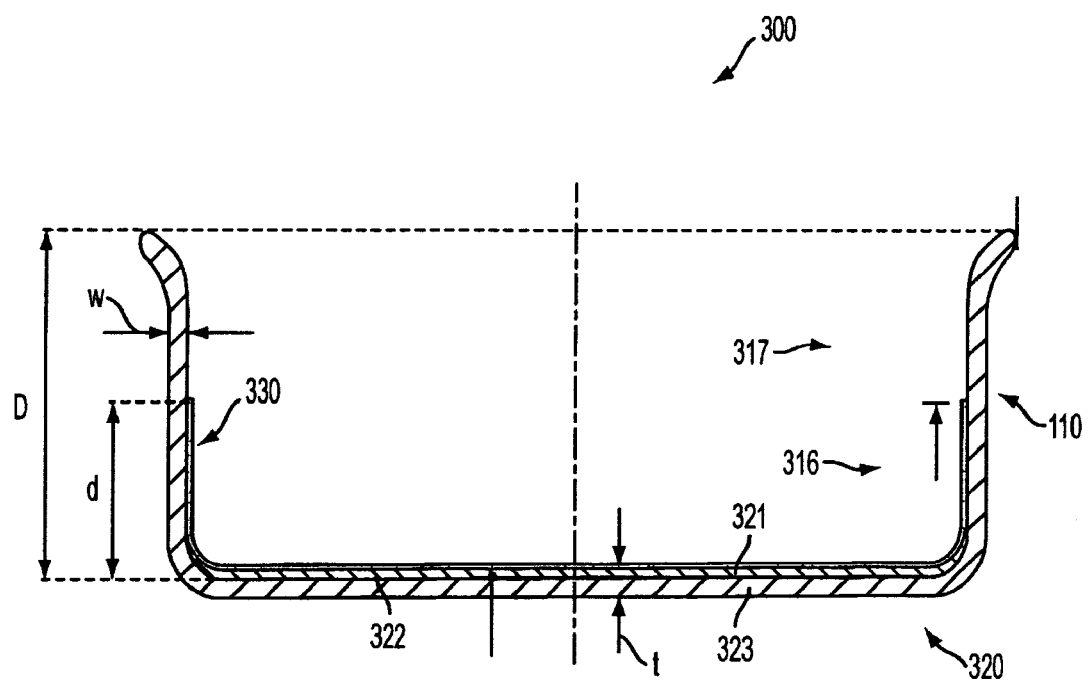
FIG. 3 is a cross-sectional elevation of an alternative embodiment of the invention.

FIG. 3 illustrates an alternative embodiment of the invention in which the bottom 320 of vessel 300 is constructed of two aluminum layers, an upper layer 322 having as thickness of about 1.5 mm and a bottom aluminum layer 323, having a thickness of about 4 mm. This increases the total aluminum thickness in the bottom of the pan to about 6.5 mm, thus improving the lateral spread of heat across the bottom 320. Thus, the temperature profile across the interior bottom surface 321 of the cooking vessel 300 is relatively uniform, despite variations in the burner or flame pattern of the heating element. In cooking vessel 300, the titanium linear 330, has a thickness of about 0.5 mm. Thus, the total thickness of the bottom of the pan 320, or t in the figure, is about 7 mm. Further, titanium liner 330, which cover the bottom of upper aluminum layer 322 and forms the inside surface of the bottom of the pan 321, extends upward to protect a lower portion 316 of the aluminum wall 317. The thickness of the upper and lower sections of the wall, labeled as w in the figure, is about 3 mm. The titanium liner thus protect the inner surface 316 of aluminum wall 317 for a total depth, labeled d in the figure, equal to about one half the height, D in the figure of the pan or cooking vessel 300.

In a preferred embodiment, the titanium liner extends upward at least to a rivet used to secure the handle of the pan to the cooking vessel.

In a more preferred embodiment, the titanium liner extends upward to cover substantially all of the interior surface of the pan. As will be apparent to one of ordinary skill in the art, the selection of the appropriate embodiment will largely depend on the overall function and dimension of the pan, as for example it would be more desirable to cover the entire interior surface of a saute or fry pan, rather than a much taller stockpot or dutch oven.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A method of fabricating a vessel with a titanium lining on at least a portion of the inner surface thereof, the method comprising the steps of:
   a) providing a first disk that comprises aluminum,
   b) drawing the aluminum to form a first fluid containing preform having downward facing sides surrounding a central planar portion of the aluminum disk,
   c) providing a second disk that substantially consists of titanium,
   d) concentrically aligning and disposing the titanium disk on an upward facing central portion of the aluminum disk,
   e) impact bonding the titanium disk to the first perform to form a second perform,
   f) inverted drawing of the second preform to form a fluid containing vessel such that the titanium disk forms;
      i) the interior bottom of the fluid containing vessel, and the periphery of the interior bottom of the fluid containing vessel.

2. The method of claim 1 further comprising the steps of:
   a) forming a recess in the central planar portion the aluminum disk, and
   b) inserting at least a portion of titanium disk in the recess.

3. The method of claim 2 wherein the titanium disk is spot welded to the center of the grooved preform prior to impact bonding.

4. The method of claim 1 wherein the titanium disk is spot welded to the center of the preform prior to impact bonding.

5. The method of claim 1 further comprising the step of anodizing the resulting fluid containing vessel.

6. The method of claim 4 further comprising the step of anodizing the resulting fluid containing vessel.

7. The method of claim 1 further comprising the step of burnishing at least a portion of the titanium oxidized or tarnished in said step of anodizing.

8. The method of claim 1 wherein the first disk substantially consists of aluminum.

9. The method of claim 1 wherein the titanium disk has a thickness of less than about 1 mm.

10. The method of claim 1 wherein the titanium disk has a thickness of less than about 0.5 mm.

11. The method of claim 1 wherein the bottom of the resulting vessel has a thickness of at least about 4.5 mm.

12. The method of claim 1 wherein the bottom of the resulting vessel has a thickness of at least about 4.5 mm and the titanium has a thickness of about 0.5 mm.

* * * * *